(12) United States Patent
Sabesan et al.

(10) Patent No.: US 7,471,669 B1
(45) Date of Patent: Dec. 30, 2008

(54) ROUTING OF PROTOCOL DATA UNITS WITHIN A COMMUNICATION NETWORK

(75) Inventors: Subramaniam Sabesan, Bishops Stortford (GB); Martin Biddiscombe, Harlow (GB); Glenn Denney, Knebworth (GB)

(73) Assignee: Nortel Networks Limited, St. Laurent, Quebec (CA)

(*) Notice: Subject to any disclaimer, the term of this patent is extended or adjusted under 35 U.S.C. 154(b) by 852 days.

(21) Appl. No.: 10/955,496

(22) Filed: Sep. 30, 2004

(51) Int. Cl.
*H04L 12/28* (2006.01)

(52) U.S. Cl. .................................. 370/351; 370/401
(58) Field of Classification Search .................. 370/351, 370/400, 401, 410, 252, 253, 428, 254, 236.1, 370/236.2, 238
See application file for complete search history.

(56) References Cited

U.S. PATENT DOCUMENTS

| | | | | |
|---|---|---|---|---|
| 5,309,433 A | * | 5/1994 | Cidon et al. | 370/390 |
| 5,504,746 A | * | 4/1996 | Meier | 370/256 |
| 5,563,878 A | * | 10/1996 | Blakeley et al. | 370/392 |
| 5,917,820 A | * | 6/1999 | Rekhter | 370/392 |
| 6,084,882 A | * | 7/2000 | Ogura et al. | 370/409 |
| 6,275,492 B1 | * | 8/2001 | Zhang | 370/392 |
| 7,334,047 B1 | * | 2/2008 | Pillay-Esnault | 709/242 |
| 2006/0002304 A1 | * | 1/2006 | Ashwood-Smith | 370/238 |
| 2006/0221929 A1 | * | 10/2006 | Le Moigne et al. | 370/351 |

OTHER PUBLICATIONS

Packet forwarding Wai Sum Lai, Communications Magazine, IEEE vol. 26, Issue 7, Jul. 1988 pp. 8-17.*
U.S. Appl. No. 10/745,886, filed Dec. 25, 2003, Ashwood-Smith et al.

* cited by examiner

*Primary Examiner*—Ricky Ngo
*Assistant Examiner*—Gary Mui
(74) *Attorney, Agent, or Firm*—Barnes & Thornburg LLP

(57) ABSTRACT

A protocol data unit is routed along a path between a first node and a second node within a communication network. The protocol data unit carries routing information which specifies the path in the form of a list of identifiers of the links to be followed towards the second node. At each intermediate node, the link identifier for the link just traversed with a link identifier for the corresponding link in the reverse direction towards the first node. At any point along the path the protocol data unit carries information which allows it to be carried towards the second node, or to follow a reverse path towards the first node. This reverse path can be used to report a fault to the first node.

21 Claims, 7 Drawing Sheets

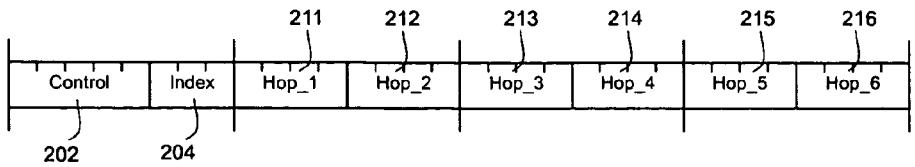
Fig. 9
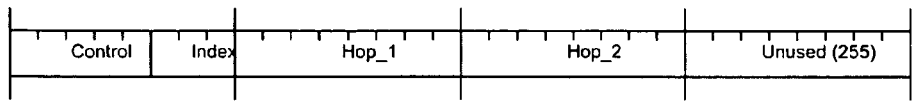
Fig. 10
| Control | Index | Hop_1 | Hop_2 |
|---------|-------|-------|-------|
| Hop_3 | Hop_4 | Hop_5 | Hop_6 |
| Hop_7 | Hop_8 | Hop_9 | Hop_10 |
| Hop_11 | Hop_12 | Hop_13 | Hop_14 |
Fig. 13
| Control | Index (9) | Hop_1 | Hop_2 |
|---------|-----------|-------|-------|
| Hop_3 | Hop_4 | Hop_5 | Hop_6 |
| Hop_7 | Hop_8 | Hop_9 | unused (255) |
| unused (255) | unused (255) | unused (255) | unused (255) |
Fig. 14
| Control | Index | Hop_1 | Hop_2 | Hop_3 |
|---------|-------|-------|-------|-------|
| | Hop_4 | Hop_5 | Hop_6 | Hop_7 |
| | Hop_8 | Hop_9 | Hop_10 | Hop_11 |
| | Hop_12 | Hop_13 | Hop_14 | Hop_15 |
Fig. 15

ROUTING OF PROTOCOL DATA UNITS WITHIN A COMMUNICATION NETWORK

FIELD OF THE INVENTION

This invention relates to routing of protocol data units within a communication network.

BACKGROUND TO THE INVENTION

Communication networks comprise a large number of interconnected network nodes, such as terminals, routers and switches. Data is communicated through a network by passing protocol data units, such as Internet Protocol (IP) packets, Ethernet frames or data cells between nodes. A particular protocol data unit may travel along a path through many such nodes and communication links and a network of this kind should efficiently route the protocol data units between nodes.

A wide range of routing protocols are known. Most routing protocols require each routing node to maintain a database of network information. This requires the node to exchange network information with other nodes and to process and store the information. One form of calculation is to construct a tree of shortest paths across the network, based on the information received from nodes. The above requirements place a significant processing burden on the nodes. The exchange of routing information can use a significant portion of the total bandwidth which could otherwise be used for carrying traffic, particularly in networks where the topology changes on a frequent basis, such as in wireless ad-hoc networks.

There exists a class of networks in which traffic patterns are very focused. The traffic in these networks generally flows either from a well known focal point out to all the other nodes, or the reverse, from all those nodes back to the focal point. In these networks rarely, if ever, does traffic flow in any other pattern. One example of a network that generally exhibits these characteristics is a wireless ad-hoc network containing a network of wireless routers spanning a neighborhood and providing wireless access to individual users in the neighborhood. In this type of network it is desirable to distribute traffic across a number of different routes so as to avoid congestion along particular links or nodes, particularly those closest to the focal node.

A U.S. patent application with U.S. Ser. No. 10/745,886, filed 23 Dec. 2003, the contents of which are incorporated herein by reference, describes a way of performing constraint based routing on a network in which traffic passes through a focal node. A source (i.e. the focal node) can specify a route which is to be followed by a target. A target can then use this routing to send traffic to the focal node. In this way, the focal node can more evenly distribute traffic across the nodes within the network.

It is desirable to use a routing scheme which minimises the amount of resources required in each node and which minimises the signalling overhead.

SUMMARY OF THE INVENTION

A first aspect of the present invention provides a method of routing a protocol data unit along a path between a first node and a second node via at least one intermediate node, the nodes being interconnected by communication links, the method comprising:

sending a protocol data unit from the first node towards the second node, the protocol data unit including routing information which specifies the path in the form of a list of identifiers of the links to be followed towards the second node; and, replacing, at each intermediate node, the link identifier for the link just traversed with a link identifier for the corresponding link in the reverse direction towards the first node.

Sending routing information in this manner reduces the computation at the first node as well as at intermediate nodes along the path. The second node can simply use the routing that it is instructed to, without the need to maintain a database of network information or the need to undertake complex processing of the network information. Intermediate nodes forward the protocol data unit using the routing information contained in the protocol data unit and also do not need to maintain a database of network information or the need to undertake complex processing of the network information. Replacing the link identifiers minimises the routing information overhead as the protocol data unit only contains as much information as it needs to at any point along the path between the first and second nodes. As soon as a link has been traversed, the identifier for that link is replaced with the identifier for the corresponding link in the reverse direction. This halves the amount of data compared to a scheme where a protocol data unit contains a complete list of identifiers for the forward and reverse directions.

Preferably, each node uses a local set of link identifiers to identify the links connecting to that node and the routing information comprises a list of the local link identifiers. As the identifiers are locally unique to each node (i.e. the same set of identifiers can be reused by another node, and do not uniquely identify a link on a network-wide basis) and each node is likely to have a relatively small number of links leading from it, the routing information can be represented in a compact form, saving transmission bandwidth.

Preferably at least one of the intermediate nodes maintains a database which contains, for each receiving link at that node, the receiving link identifier used locally by that node and the sending link identifier for that link used by a neighbouring node. Upon receiving a protocol data unit on a link at the intermediate node, the intermediate node determines the expected sending link identifier corresponding to the link on which the protocol data unit was received. The intermediate node also inspects the link identifier in the received routing information and determines whether the identifier in the routing information matches the expected sending link identifier. If there is no match, then the protocol data unit has been incorrectly received and can be discarded.

Preferably, the routing information specifies a path which the second node should use for sending protocol data units to the first node. The first node can be a focal node of a network, the focal node maintaining information about the network and using the information to select the routing information. Sending routing information from a focal node which specifies a path to be followed by traffic from another node has the advantage of distributing traffic between nodes of the network compared to allowing individual nodes to calculate paths.

Although in this application a wireless-based network will be described, and the nodes will be discussed as communicating with each other and with end users using various wireless protocols, the invention is not limited in this regard. Rather, the invention may be used more broadly with other types of communication technology, such as wireline, infra red, acoustic, and numerous other types of communication technology.

The functionality described here can be implemented in software, hardware or a combination of these. The invention can be implemented by means of hardware comprising several distinct elements, and by means of a suitably programmed computer. Accordingly, another aspect of the invention provides software for performing any of these methods. It will be appreciated that software may be installed on the node at any point during the life of the equipment. The software may be stored on an electronic memory device, hard disk, optical disk or other machine-readable storage medium. The software may be delivered as a computer program product on a machine-readable carrier or it may be downloaded directly to the node via a network connection.

BRIEF DESCRIPTION OF THE DRAWINGS

Embodiments of the invention will be described, by way of example only, with reference to the accompanying drawings in which:

FIGS. 9-15 show example structures of headers to carry the routing information;

DESCRIPTION OF PREFERRED EMBODIMENTS

Figure 1:
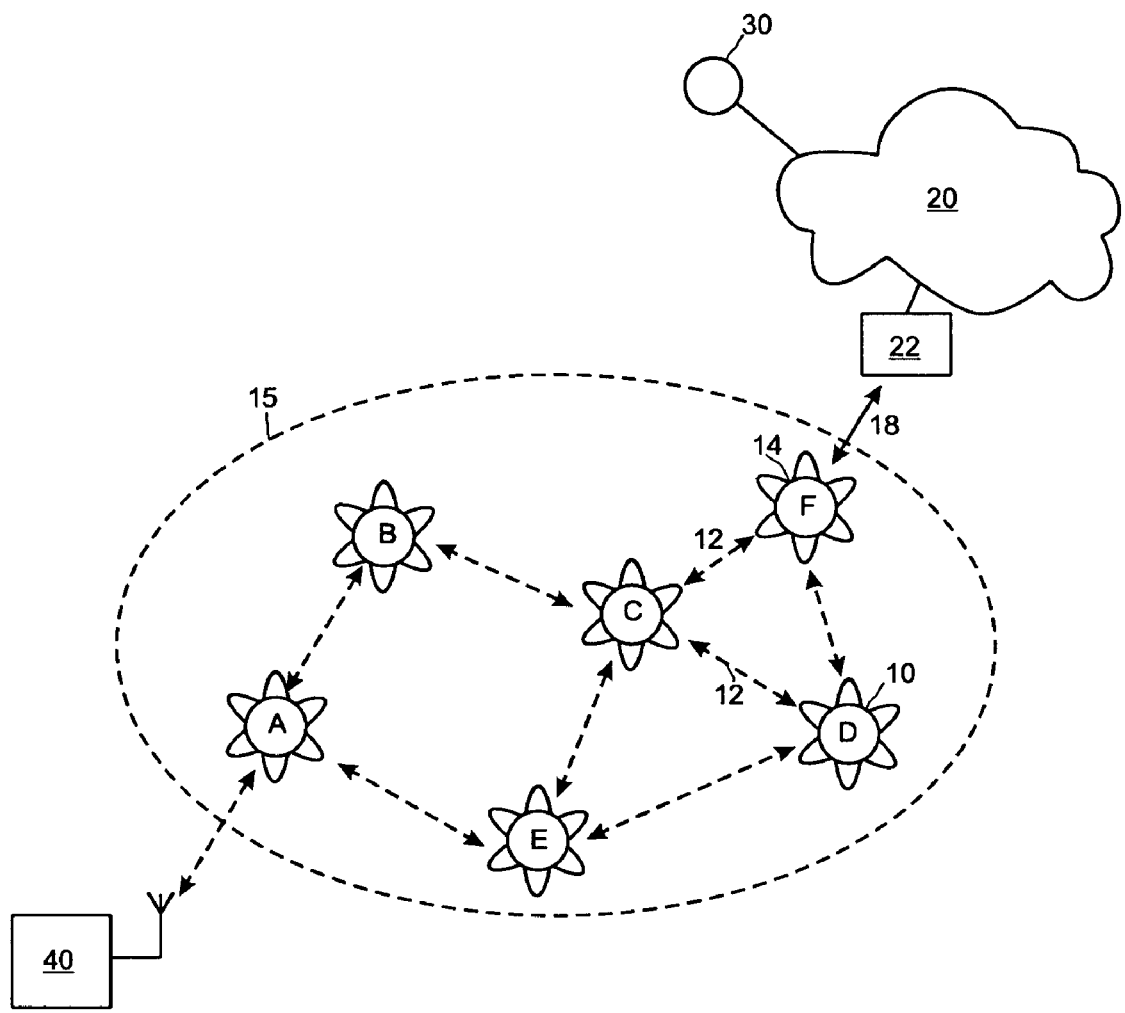
FIG. 1 shows an example network in which the invention may be applied.

FIG. 1 shows an example communication network. A focal node 14 is connected by communication links 12 to other nodes 10 within domain 15. The nodes 10 are connected to each other by links 12 to form a mesh within domain 15, although the invention is not limited to a mesh topology. The focal node 14 is connected by relatively higher bandwidth resources 18, such as a wired link, to a packet gateway 22. The packet gateway 22 is connected to a high speed communication resource 20 such as the Internet or Public Switched Telephone Network (PSTN). Many such domains 15 can be provided in the same manner, each having a similar focal node 14 and a set of nodes 10. Traffic can be routed from one domain 15 to another via the network 20, or to remote servers 30 also connected to network 20. The nodes 10 in domain 15 have been labelled A-E for reference. Focal node F may be considered a node within the domain 15 or may be considered a node on the border of the domain 15, as shown. In the example illustrated in FIG. 1, there is one focal node in domain 15, although the invention is not limited to this particular example.

The nodes 10 in the domain 15 may communicate between each other using one wireless technology and may communicate with end users, such as a wireless terminal 40, using another wireless technology. These wireless technologies may be distinguished by frequency or protocol. In one implementation, the wireless technologies are IEEE 802.11a and IEE 802.11b although one of the IEEE 802.16x protocols, the Universal Mobile Telecommunication System (UMTS) wireless communications protocol, the IEEE 802.11a wireless communication protocol, IEEE 802.11g standard, Hiper-LAN, Bluetooth. or other emerging protocols such as IEEE 802.18 could also be used. The user terminal 40 can be a mobile telephone, a data terminal such as a laptop or personal digital assistant (PDA) or any other kind of communications device.

In the type of network shown in FIG. 1 the traffic patterns are such that most (or all) of the traffic will be directed from the nodes 10 to the focal node 14, and from the focal node 14 outward towards the nodes 10. It is envisaged that there will typically be 20-25 nodes per domain 15 although the number could be less or significantly more than this.

Focal node 14 maintains a database which includes information about the topology of domain 15 (i.e. how the nodes are connected together) and preferably also includes one or more metrics for the links between nodes, such as bandwidth, power or distance. When a node 10 wishes to send a packet to the focal node 14 it uses a routing which has been determined by the focal node rather than a routing which is calculated by the node 10 itself. This reduces the processing and storage requirements of each node 10 and allows it to be manufactured and deployed more cheaply. The process of obtaining this routing information will now be described in more detail.

A node routes a packet by specifying a compact vector (list) of link identifiers that the packet must follow. This vector is received by the node 10, and does not need to be calculated by it. The vector identifies links that the packet should traverse rather than identifying nodes. Links can be compactly represented since each link identifier is a number which is local to each node and the number only has to be large enough to represent the degree (number of adjacencies) of the node. For most real networks, the maximum degree that is likely to be seen is well below 64 and for many specialized networks; the degree may be 4 or less. In the network of FIG. 1, node A may have a set of four links leading from it, each link being numbered locally to the node as 1-4. Similarly, node B may also have four links leading from it, each link also being numbered locally to the node as 1-4. The link identifiers 1-4 are not unique across the domain 15, but are only unique within each node A-E.

Figure 2:
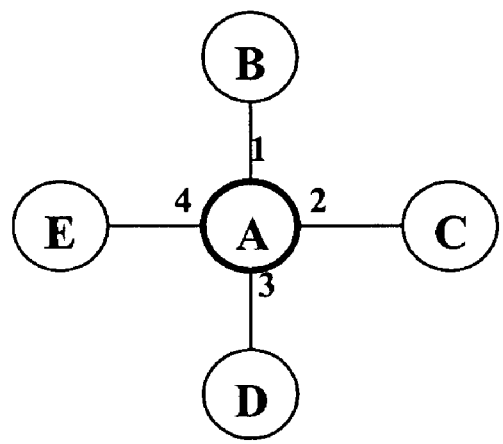
FIG. 2 shows a set of nodes and their interconnecting links.

FIG. 2 shows a simple set of nodes A-E. Each node is connected to a number of neighbouring nodes by edges or links. Each of the links is given a local identifier. For example, node A has 4 neighbours B, C, D and E and has a link to each of them which is numbered #1, #2, #3 and #4 respectively. If A has more than one link to one of its neighbours, this additional link can be assigned a different number, or both links can be identified with the same number. If the links to neighbours are numbered in this way, then only a very small range of numbers are required. There is certainly no need for 32 bits to represent the local link identifier. Usually a single byte will do, and often 3 or 4 bits will be sufficient. Since a link identifier is a purely local number there are two link identifiers associated with any real link between nodes. This is of course because each end specifies its own local link identifier.

Figure 3:
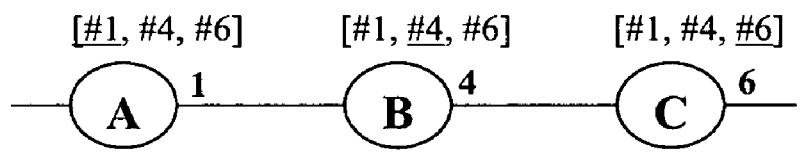
FIG. 3 shows the routing of a packet between a set of nodes in a forward direction based on link identifiers.

As each link has a locally unique outgoing and incoming link identifier, it is possible to specify, unambiguously, a route across a network as a vector of link identifiers. Referring to FIG. 3, the vector [#1, #4, #6] specifies a unique 3 hop route. At the first node (node A), take output link #1, at the second node (node B) take output link #4 and at the third node (node C) take output link #6. Stated more formally, the forwarding operation is:

1. Advance a 'next hop' index in the vector;
2. Look up the interface corresponding to the next hop in the vector;
3. Queue the packet for transmission on the interface that is being looked up in step 2.

In the forwarding operation above, the routing information includes the vector of links and the 'current hop' index which specifies which hop in the vector should be inspected. In the accompanying figures the current hop is shown by underscoring, e.g. [#1, #4, #6].

The above description explains the basic concept of source routing, i.e. the source specifies the route that a packet should take. However, in the network of FIG. 1 the source is a node 10 and it is desirable that this node should be provided with this routing information by the focal node 14. As the vector specifies link IDs, and not node IDs, the forward path (from focal node 14 to a node 10) and reverse path (from node 10 to the focal node 14) will not be the same list of IDs. The following passage describes how the vector is created by the focal node.

The focal node 14 sends a packet towards a particular node 10 within the network. The packet specifies a list of link IDs that the packet should follow at each node. Once the packet reaches a node along the path, the link ID for the path just traversed is replaced by the link ID for the same path in the reverse direction. Stated more formally, the logic is:
1. Set the vector element associated with the current value of the 'next hop' index to the (local) value of the link ID on which the packet was received;
2. Increment the 'next hop' index;
3. Look up the interface given by the vector element associated with the new value of the 'next hop' index.
4. Queue the packet for transmission on the interface looked up in step 3.

Figure 4:
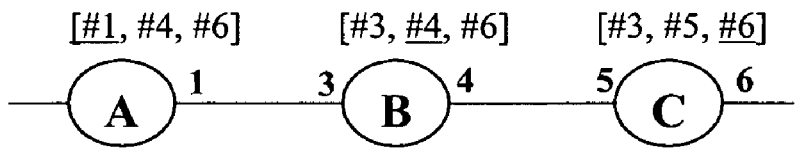
FIG. 4 shows how routing information is updated as a packet is routed between the nodes of FIG. 3.

In the example shown in FIG. 4 a packet is routed from A (focal node) to node C via an intermediate node B. As before the sequence of link IDs is [#1, #4, #6]. At the focal node (node A) the packet leaves node A on link ID #1. When the packet arrives at node B, node B finds the link ID corresponding to the reverse path to A, which is link ID #3. This link ID is stored in the list of vectors as part of the reverse path routing. Since the first hop is now complete, the link ID for the first hop (from A to B, link ID #1) is no longer needed and so the reverse path link ID can overwrite this value. Hence, the vector, upon leaving node B is now [#3, #4, #6]. In the same manner, upon arriving at node C, node C finds the link ID corresponding to the reverse path to B, which is link ID #5. This link ID is stored in the list of vectors as part of the reverse path routing. Since the second hop is now complete, the link ID for the second hop (from B to C, link ID #4) is no longer needed and so the reverse path link ID can overwrite this value. Hence, the vector, upon leaving node C is now [#3, #5, #6]. Wherever the packet is inspected in the network, the portion of the vector prior to the next hop index is the reverse path from the current node to the origin, and the path vector after and including the next hop is the forward path to the destination. For example, if we catch a packet with the link id vector [#4, #5, #3, #6#2, #1] then the path back to the source from the current node is [#3, #5, #4] and the path to the destination from the current node is [#6, #2, #1]. This property of the link id vector is very useful from an OA&M perspective because it is possible to unambiguously identify the packet's entire route without having to trace a circuit, or ping.

Figure 5:
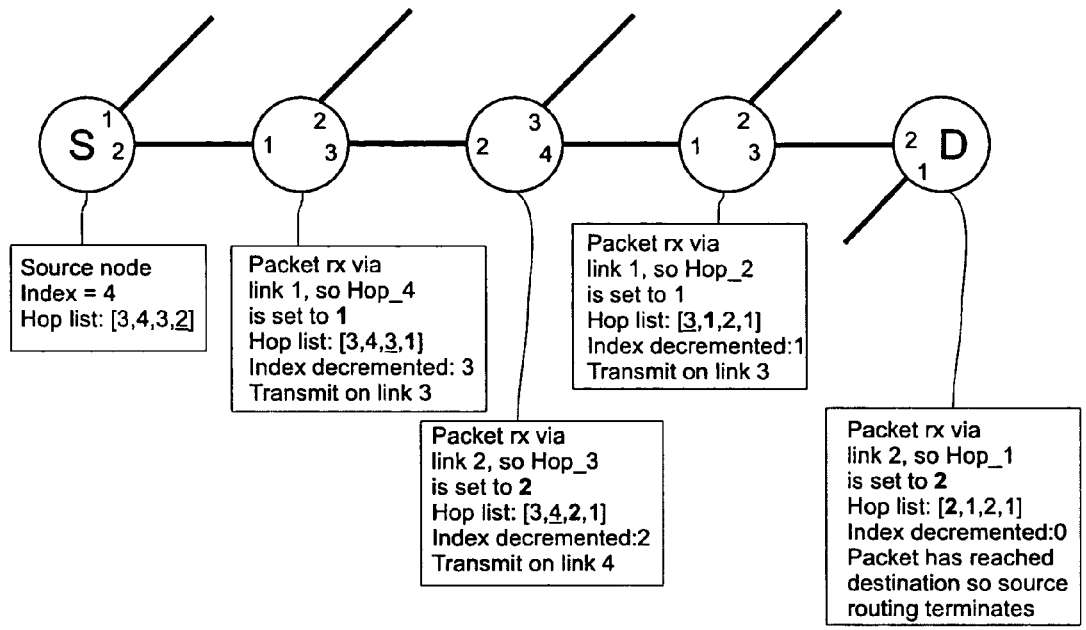
FIG. 5 shows a further example of routing between nodes based on link identifiers.

FIG. 5 shows another example of the processing involved when a packet is source routed from a source (such as a focal node 14) to a destination (such as a node 10) via a 4 hop route. The list of interface-IDs/link-IDs within the header is shown at each node and the forward link IDs are swapped with the reverse link IDs at each node. This embodiment differs from that just described in that the index value, which is the pointer pointing to the current location within the list of link identifiers, is initially set to the total number of hops in the path. As this example is a 4 hop route the index is initially set to 4. The index value is decremented at each node and once the index value has reached zero it is determined that the packet has reached the destination, so the source routing is terminated at that node. On reaching the destination node, the list of link IDs has been replaced by the corresponding list of link IDs that should be used for the reverse path back to the source. A particular value of link ID is reserved as a padding character. As will be described more fully later, any unused space within the protocol data unit reserved for routing information are set to the padding value. Any node (but especially the last node on the path) can determine the original path length when it comes to reversing the path and setting the initial value of the index for packets to be sent in the reverse direction. Preferably all nodes are aware of the padding character.

Detecting Path Errors

Figure 6:
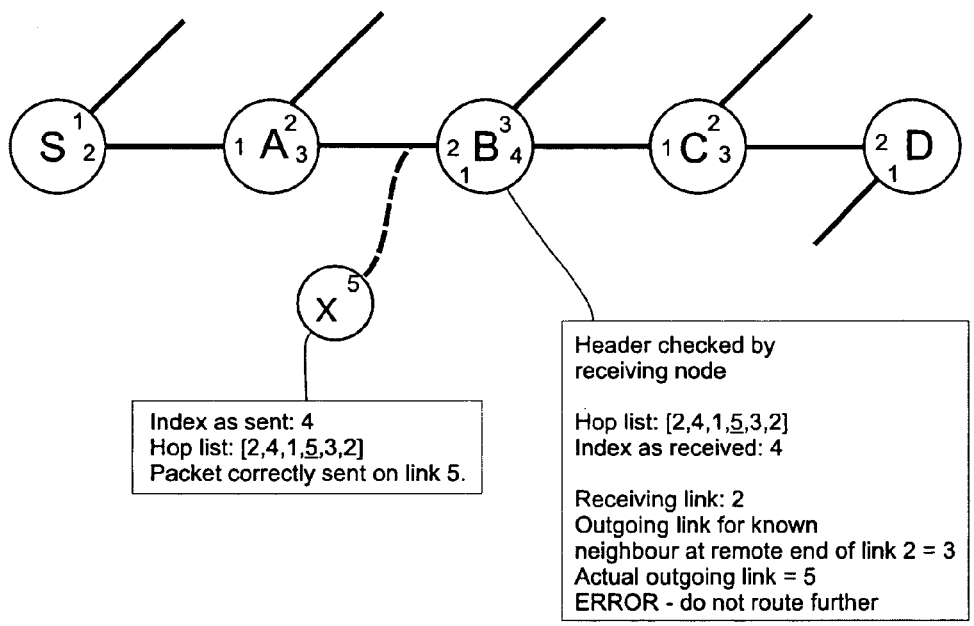
FIG. 6 shows a situation where a packet is incorrectly received by a node.
Figures 7, 8:
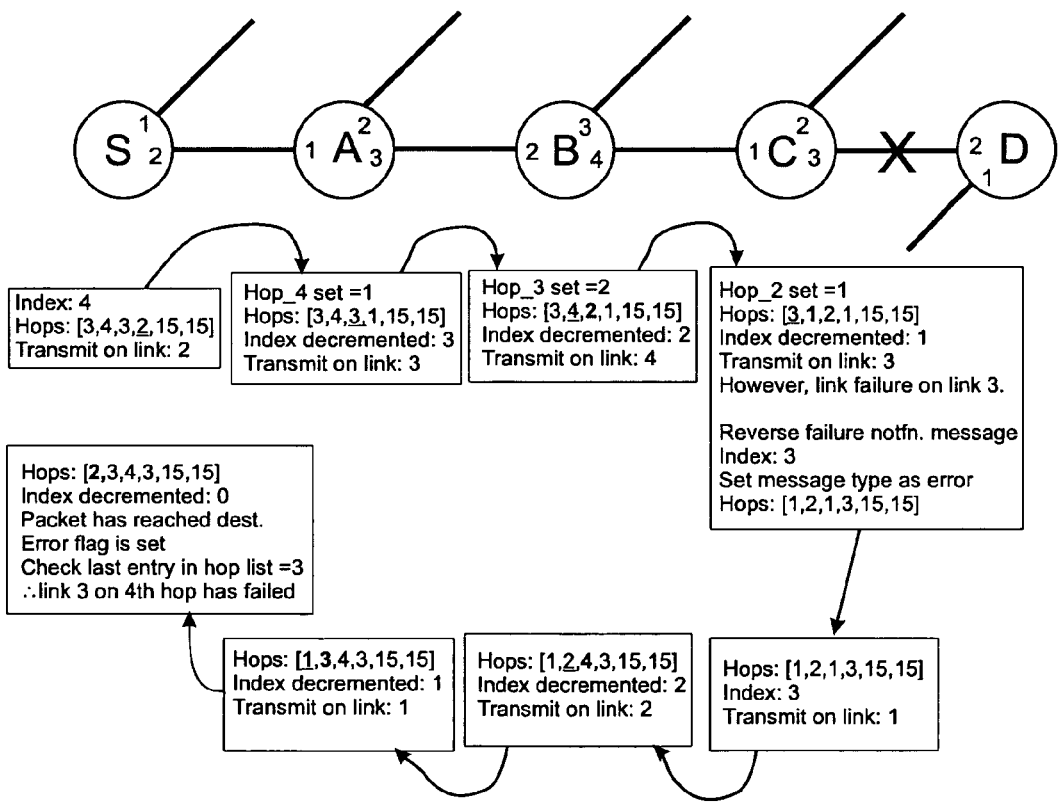
FIG. 7 shows a table, used at a node, which relates receiving link identifiers to expected sending link identifiers.
FIG. 8 shows a situation where a fault is present on one of the communication links.

Transmission and routing errors can sometimes occur in a network and on occasions a node may incorrectly receive a packet that was not intended to be received by that node. In wireless networks this could happen due to wireless 'crosstalk'. This routing scheme allows errors to be detected in certain circumstances, and this is explained with reference to FIG. 6. Each node maintains a table of link IDs. FIG. 7 shows a table for node B. For each receiving link at the node, the table lists the local ID for that receiving link and the outgoing link ID for that same link as used by the neighbouring node. This information can be obtained by signalling exchanges between nodes during configuration, and can be updated during operation of the network as changes occur. If the packet is transmitted on its outgoing node's link x, and received on link y, but the lookup table on the receiving node indicates that packets received on link y were expected to have come from a node sending on link z, then the receiving node can deduce that this packet has been received in error and will not route it any further. As an example, receiving link ID has ID=2 and the neighbouring node (node A) assigns a local ID=3 to the same link. In FIG. 6 node B receives a packet on interface 2 by error. This packet has been sent by node X towards interface 1 of node B but is received on interface 2 due to crosstalk for example. Each node maintains a table of the kind described above that maps its incoming interfaces to its neighbours outgoing interfaces. When node B receives the packet from node X on receiving interface 2, it inspects the routing information within the header of the packet. By using the index, node B can readily identify which ID within the list represents the sending ID of the last hop. The sending interface ID at the last node was 5. However, the outgoing interface ID of node A, which corresponds to receiving link ID 2 is 3. Therefore, node B determines that this packet has been received in error and the packet is discarded. However, if a packet is received in error, but the sending link ID of that incorrect neighbouring node happens to correspond the sending link ID of the correct node, then the error will be undetected by node B. However, the probability of this occurring is relatively low, and the probability decreases as the number of links/interfaces at a node increases.

Rapid Link Failure Detection

Link state routing protocols such as OSPF use the 'hello' dead interval to detect link failures and then use Link state advertisements to propagate the change in topology to the whole network. This behaviour is described in RFC 2328, see particularly sections 7.1, 9.5, 10.5 and also sections 10.2 "events causing neighbor state changes" and 10.3 "the neighbor state machine". With the source routing scheme described here, the reverse route towards the source is recorded as the packet traverses the network. When a node detects a link failure downstream, it can send a rapid failure message to the source node using the recorded reverse source route from itself to the source node. Using this failure message to detect network failures can provide a faster failure detection message than standard link state advertisements in OSPF and has the advantage that the failure message is directed towards the focal node without the need to broadcast to all of the nodes within the domain/network. FIG. 8 shows an example scenario.

When a node detects a link failure, it uses the recorded reverse route back to the source to send the error notification message to the source node. The node also keep the failed link's ID within the header as the last entry (last entry before any padding), so that the source node can determine the failed link from the notification message. In this example, the failed link has a link ID=3, which is stored at the end of the list before the padding values '15'.

It will be appreciated that there are various ways in which packets can be modified to carry the routing information as described above. In order to show how the invention can be worked, the following describes some preferred schemes but these are not intended to limit the scope of protection.

The routing information can be carried by a header. For optical transmission systems, such as Synchronous Optical Networking (SONET) or Dense Wavelength Division Multiplexing (DWDM) implementations, the header can follow the Generic Framing Procedure (GFP) header as an extended GFP header. For Ethernet transmission systems there can be a new encapsulation type. In addition to the forwarding information described above, the header should include bits to indicate how the packet is to be treated for queuing priority on transmission, and how the packet is to be treated for discard in the event that the desired queues are full or getting full. These two quantities are normally referred to as emission and discard priority and together they define the major controls for relative packet treatment (QoS). The preferred minimum overall number of fields required in the header is:

Packet type: an indication of the intended purpose of this packet. Note that no special OA&M (operations, administration & management) bits are required because this field can indicate an OA&M vs. a user purpose.

Emission Priority: an indication of which transmit Queue to place the packet on;

Discard Priority: an indication of when to discard given the above queue is filling;

Vector: a vector of link indexes (local identifiers of a link or an interface to the link);

Index: a pointer into the vector indicating the current hop;

Extension Bits: used to increase the length of the vector/index to accommodate more hops.

Given the above fields, a 4-5 hop header can be encoded as a single word.

It is preferred that the header is of fixed length and format as this will simplify processing, especially if hardware assistance is required. The header should be compact to minimise the transmission overhead. The header should be extendable to allow use on long routes, provide control functions or future extensions. It is desirable if the format chosen enabled route problems to be detected at an early stage; e.g. topology changes after source route was calculated.

An example of such a compact header is shown in FIG. 9. Since each of the link identifiers is a local number to a node, usually a single byte is enough to hold this identifier, and often 3 or 4 bits is sufficient. Therefore, with a 32 bit (4 bytes) compact header, it is possible to accommodate 5 or 6 hops of source routing information including the control data. The header is 4 bytes in length and can accommodate up to 6 hops per header, shown as fields 211-216. A 4 bit link identifier field can support up to 15 links (circuits) per node. A 5 bit control flag can include the following:

Hop-width flag (1 bit)
    If set to 0, then each hop encoded in 4 bits; header lists up to 6 hops
    If set to 1, then each hop encoded in 8 bits; header lists up to 3 hops
Class of Service and Trace (3 bits)
    Value maps to table determining
        Class of Service (e.g. voice/data)
        Trace option (whether destination WARP executes trace-response function)
Extended header flag (1 bit)
    If set, there is another header behind this one
    Extension headers may contain further hops on route, or
    Last extension header may be used for additional control data The Index field points the current position of the source route, and the operational functionality varies depending on its value.

Index is initialised to number of hops listed in this header decrements at each node as the packet traverse the nodes
If extended header flag not set, index value of 0 indicates end of source route
If extended header flag is set, index value of 0 indicates that the operation need to be proceeded to the next header
If the index value is set to 7 (only valid within an extension header) indicates that this header contains control data The header shown in FIG. 9 can encode up to 6 hops, each with a 4-bit value. The header shown in FIG. 10 can carry data for up to 3 hops. In this case, the first two fields carry data and the final field is unused and is set to the maximum value. Source routes hops are listed in reverse order and therefore the first hop on the route is the last entry (indicated by the initial value of the index field) in the list of hops. If the Extended Header flag is set, all the hops in the first header are traversed before any in the second or any subsequent header. Unused hop fields must be padded with all Is (corresponding to a value of 15 or 255 depending on the hop field width) so that route length can be determined at the destination node prior to the route reversal step.

Figure 11:
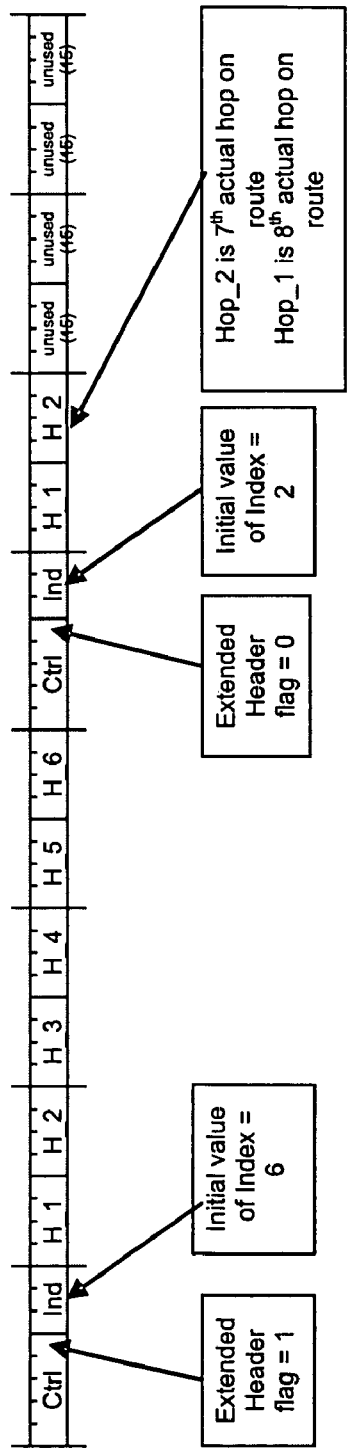

FIG. 11 shows an extended header. The header field can be repeated as necessary to provide for routes of longer than 6 hops, each repetition of the header providing for up to 6 more hops.

Figure 12:
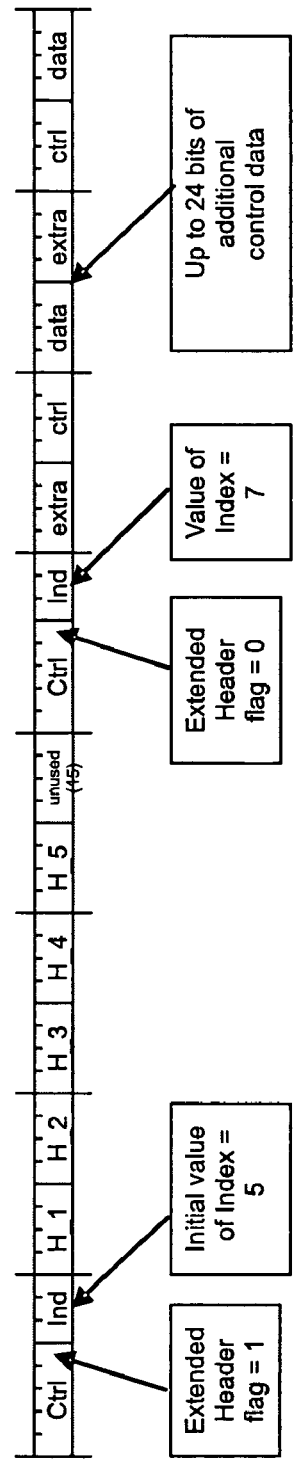

FIG. 12 shows an extended header carrying control data within the second 4-byte header. The Index field of the extension header that carries the control data is set to 7 to indicate that the data is not hop data (valid values of index for hop data are 0-6). Index value of 0 indicates "no more hops left" in this header.

The header format shown in FIGS. 9-12 is best suited to small and medium scale networks. FIGS. 13-15 show an alternative header format which is suited to larger networks. In FIG. 13, a 16 byte header includes a control field (8 bits), an index field (8 bits) and 14 bytes specifying link IDs. FIG. 14 shows a header of this type at the start of a 9 hop route. The link IDs for the forward path are listed in reverse order, with the first link ID being the last entry in the list (Hop 9). The index is initially set to a value of 9 (the last link ID in the list). Each node along the route can have a local link ID in the range 0-254. The value of 255 is reserved as a padding value. Unused hop fields are set to the padding value of 255. In the alternative header format of FIG. 15 the control and index fields are combined into the first byte of the header, to accommodate up to 15 one byte link IDs.

Basic Source Routing Operation

Figure 16:
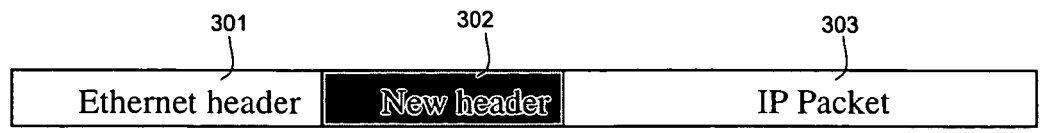
FIG. 16 shows how the new header is carried within an Ethernet frame.

The originating node adds the source routing header to IP packets and forwards the packets towards the destination node according to the source route. In the case of Ethernet as the underlying transmission medium, the source routed header would be a new encapsulation type. The new header 302 is inserted in between the Ethernet header 301 and the IP header & packet 303 as shown in FIG. 16.

The intermediate nodes forward the packets using the new source routing header information. The destination node removes the source routing header and forwards the IP packet 303 to the destination. When the destination wishes to transmit data towards the source node, it reverses the recorded source route and uses it to route packets back to the source node. Here is a summary of the basic routing scheme:

When a packet is received on circuit <link-in >, the node does the following;
Set Hop_<Index>to <link-in >
Decrement the value of Index
If Index=0 and Extended Header flag=0: packet has reached destination node
Forward encapsulated IP packet to destination
Reverse list of hops to give route back to source
Stop further processing
If Index=0 and Extended Header flag=1: process next header
If Index≠0
Examine Hop_<Index> and retrieve pointed-to link: <link-out>
If not the originating node, decrement Index
Forward packet via circuit <link-out>

When the route arrives at the terminating node the index has reached a value of zero. The terminating node determines the total length of the route by summing the number of valid link IDs in the list (i.e. link IDs # the padding value). For the reverse routing, the index is initially set to the determined number of valid link IDs. The list of link IDs is also reversed for the reverse routing.

Figure 17:
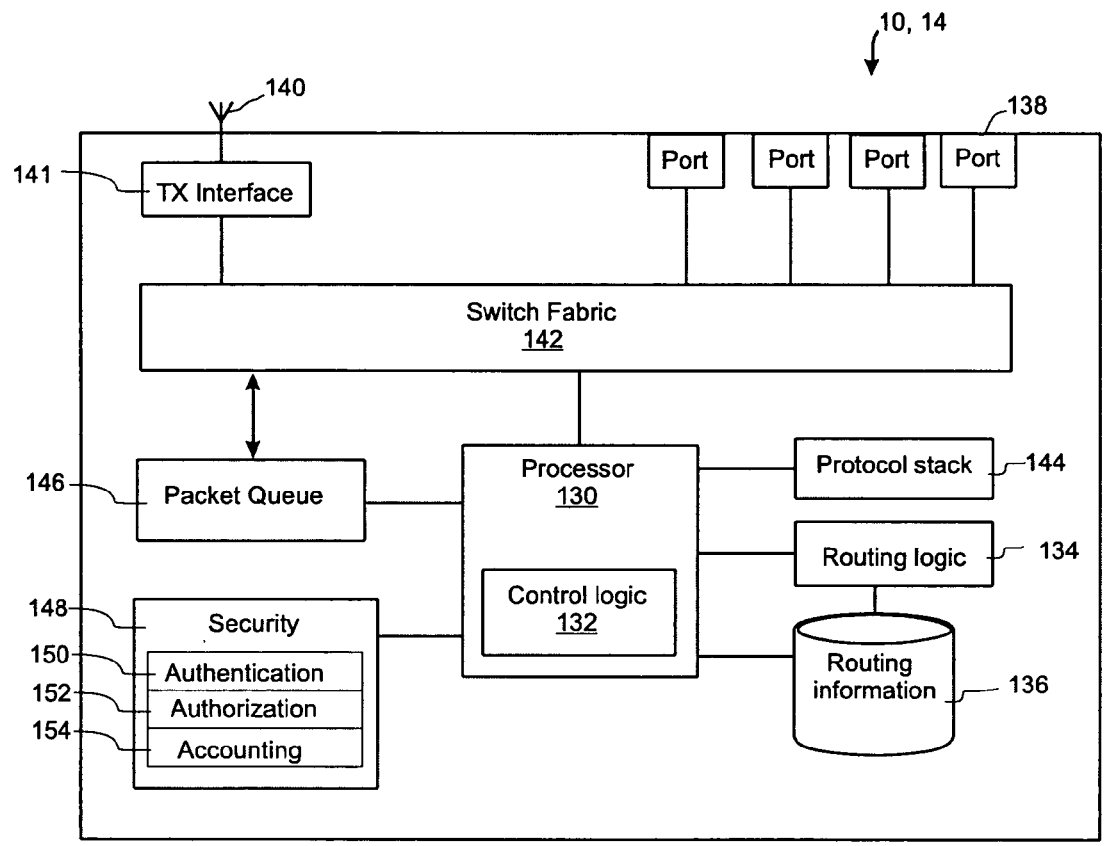
FIG. 17 shows a block diagram of the functions within a node of the network of FIG. 1.

FIG. 17 is a functional block diagram of a node configured to implement an embodiment of the invention. The node 10, 14 generally includes a processor 130 containing control logic 132 configured to perform functions described to enable the node to perform routing. The processor 130 may interface routing software 134 and routing tables 136 to enable it to perform the functions described above. The network element may be provided with one or more components (hardware and/or software) to enable it to communicate on a communication network. The node includes a plurality of network ports 138 as well as a transmission interface 141 and antenna 140 to enable the node to communicate using both wireline and wireless technologies. The various interfaces (wireless and wireline) are connected to a switch fabric 142 that operates under the control of the processor 130. A protocol stack 144 containing data and instructions configured to enable the node to participate in protocol exchanges on the network may optionally be included. Other conventional network element features, such as a packet queue 146 configured to temporarily store protocol data units for transmission on the network, may also be included. Additionally, the node may include a security module 148 containing an authentication module 150 configured to authenticate users, devices, or connections on the network, an authorization module 152 configured to determine appropriate authorization control information to prevent unauthorized access to the network, and an accounting module 154 configured to enable accounting entries to be established for communication sessions on the network. Other modules may be included as well and the invention is not limited to a particular implementation of the network device.

The functions described above may be implemented as a set of program instructions that are stored in a computer readable memory within the network element and executed on one or more processors within the network element. However, it will be apparent to a skilled person that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

Referring again to FIG. 1, a focal node 14 can select a routing which nodes A-E should use for their traffic. The focal node performs traffic engineering within domain 15 to maintain a link state table containing resource allocations of links and connection reservations through the domain. The resource allocations may relate to any type of value associated with the link. For example, the focal node may keep track of bandwidth, power, distance, impairments, any combination of these and other values, or may maintain a table of unitless values configured to enable the focal node to balance use of the links. For example, in an IP/TCP network, the TCP protocol will speed up/down depending on the link congestion/loss. Balancing the use of the links, using whatever values/units are chosen to implement the resource allocation, enables the congestion to be dispersed so that end applications are able to obtain similar throughput on the network. When a connection is to be added on the domain, the focal node determines a path given the constraints reflected in the link state table and allocates bandwidth or another metric on the links forming the path. This path is affiliated with the connection in a connection table, and is used to generate headers for protocol data units associated with the connection. The protocol data unit headers convert the protocol data units into source routed packets that contain path information to enable the packets to be routed through the domain. Traffic from the nodes toward the focal point follow the same path.

The invention is not limited to the embodiments described herein, which may be modified or varied without departing from the scope of the invention.

What is claimed is:

1. A method of routing a protocol data unit at a node within a network, the network comprising a first node, a second node and at least one intermediate node, the nodes being interconnected by communication links, the method comprising:

receiving a protocol data unit carrying routing information in the form of a list of identifiers of the links of the path to be followed by the protocol data unit towards the second node;

replacing the link identifier for the link just traversed with a link identifier for the corresponding link in the reverse direction towards the first node;

providing an index pointing to a current link in the list of link identifiers;

using the index to determine if the protocol data unit needs to be forwarded to another node;

if the node determines that the protocol data unit does not need to be forwarded to another node, filling unused space within the routing information with a padding value; and determining the total length of the path by summing the total number of link identifiers, in the list of link identifiers, which are not equal to the padding value.

2. A method according to claim 1 wherein the link identifiers are locally unique to each node along the path.

3. A method according to claim 1 wherein the method further comprises updating the value of the index.

4. A method according to claim 3 wherein the list of link identifiers is in reverse order, with the link identifier for the first link in the forward direction between the first node and the second node being last in the list, and the step of updating the index decrements the value of the index.

5. A method according to claim 1 wherein if the node determines that the protocol data unit does not need to be forwarded to another node, the step of determining the total length of the path comprises summing the total number of valid link identifiers in the list of link identifiers.

6. A method according to claim 1 wherein if the node determines that the protocol data unit does not need to be forwarded to another node, the method further comprises using the routing information in the protocol data unit to route a protocol data unit to the first node.

7. A method according to claim 1 further comprising providing a database at the node which contains, for each receiving link at that node, the receiving link identifier used locally by that node and the sending link identifier for that link used by a neighbouring node;

determining the expected sending link identifier corresponding to the link on which the protocol data unit was received;

inspecting the link identifier in the received routing information; and, determining whether the identifier in the routing information matches the expected sending link identifier.

8. A method according to claim 7 wherein if the routing information does not match the expected sending link identifier the protocol data unit is not routed any further.

9. A method according to claim 1 further comprising:
determining when a fault occurs along the path; and,
sending a fault reporting message towards the first node using the link identifiers of the reverse path stored in the routing information.

10. A node for use as part of a network comprising a first node, a second node and at least one intermediate node, the nodes being interconnected by communication links, the node comprising control logic which is operable to:

receive a protocol data unit carrying routing information in the form of a list of identifiers of the links for the path to be followed by the protocol data unit towards the second node; and, replace the link identifier for the link just traversed with a link identifier for the corresponding link in the reverse direction towards the first node;

provide an index pointing to a current link in the list of link identifiers;

use the index to determine if the protocol data unit needs to be forwarded to another node;

fill unused space within the routing information with a padding value if the node determines that the protocol data unit does not need to be forwarded to another node; and determine the total length of the path by summing the total number of link identifiers, in the list of link identifiers, which are not equal to the padding value.

11. A node according to claim 10 wherein the link identifiers are locally unique to each node along the path.

12. A node according to claim 10 wherein the node is further operable to update the value of the index.

13. A node according to claim 12 wherein the list of link identifiers is in reverse order, with the link identifier for the first link in the forward direction between the first node and the second node being last in the list, and the node is further operable to update the index by decrementing the value of the index.

14. A node according to claim 10 wherein, if the node determines that the protocol data unit does not need to be forwarded to another node, the node is further operable to determine the total length of the path by summing the total number of valid link identifiers in the list of link identifiers.

15. A node according to claim 10 wherein, if the node determines that the protocol data unit does not need to be forwarded to another node, the node is further operable to use the routing information in the protocol data unit to route a protocol data unit to the first node.

16. A node according to claim 10 which further comprises a database which contains, for each receiving link at the node, the receiving link identifier used locally by the node and the sending link identifier for that link used by a neighbouring node, the node being further operable to:

determine the expected sending link identifier corresponding to the link on which the protocol data unit was received;

inspect the link identifier in the received routing information; and, determine whether the identifier in the routing information matches the expected sending link identifier.

17. A node according to claim 16 wherein it the routing information does not match the expected sending link identifier the protocol data unit is not routed any further.

18. A node according to claim 10 which is further operable to:

determine when a fault occurs along the path; and, send a fault reporting message towards the first node using the link identifiers of the reverse path stored in the routing information.

19. A communication network including at least one node according to claim 10.

20. A computer readable medium embodying a computer program product comprising instructions executable by a processor of a computing device for controlling a node of a communication network, the network comprising a first node, a second node and at least one intermediate node, the nodes being interconnected by communication links, the instructions comprising:

code for receiving a protocol data unit carrying routing information in the form of a list of identifiers of the links of the path to be followed by the protocol data unit towards the second node;

code for replacing the link identifier for the link just traversed with a link identifier for the corresponding link in the reverse direction towards the first node;

code for providing an index pointing to a current link in the list of link identifiers;

code for using the index to determine if the protocol data unit needs to be forwarded to another node;

code for, if the node determines that the protocol data unit does not need to be forwarded to another node, filling unused space within the routing information with a padding value; and code for determining the total length of the path by summing the total number of link identifiers, in the list of link identifiers, which are not equal to the padding value.

21. A method of routing a protocol data unit along a path between a first node and a second node via at least one intermediate node, the nodes being interconnected by communication links, the method comprising:

sending a protocol data unit from the first node towards the second node, the protocol data unit including routing information which specifies the path in the form of a list of identifiers of the links to be followed towards the second node;

replacing, at each intermediate node, the link identifier for the link just traversed with a link identifier for the corresponding link in the reverse direction towards the first node;

providing an index pointing to a current link in the list of link identifiers;

using the index to determine if the protocol data unit needs to be forwarded to another node;

if the node determines that the protocol data unit does not need to be forwarded to another node, filling unused space within the routing information with a padding value; and determining the total length of the path by summing the total number of link identifiers, in the list of link identifiers, which are not equal to the padding value.

* * * * *